(No Model.) 2 Sheets—Sheet 1.

G. F. DEACON.
APPARATUS FOR INDICATING THE VELOCITY OR MEASURING THE FLOW OF WATER.

No. 305,433. Patented Sept. 23, 1884.

FIG. 1ᴬ.

WITNESSES.
Frederick John Cheesbrough
James Andrew Coulbrough

INVENTOR.
George Frederick Deacon

N. PETERS. Photo-Lithographer, Washington, D. C.

(No Model.)
2 Sheets—Sheet 2.
G. F. DEACON.
APPARATUS FOR INDICATING THE VELOCITY OR MEASURING THE FLOW OF WATER.
No. 305,433.  Patented Sept. 23, 1884.
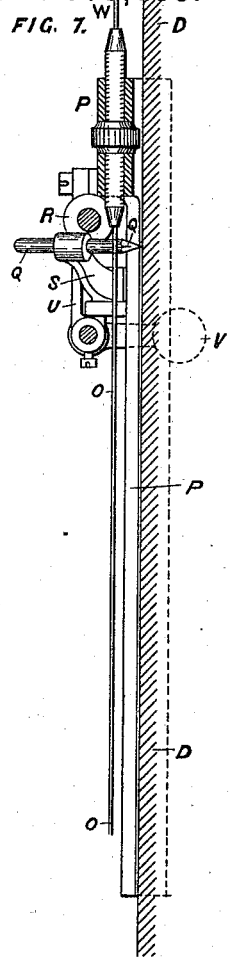
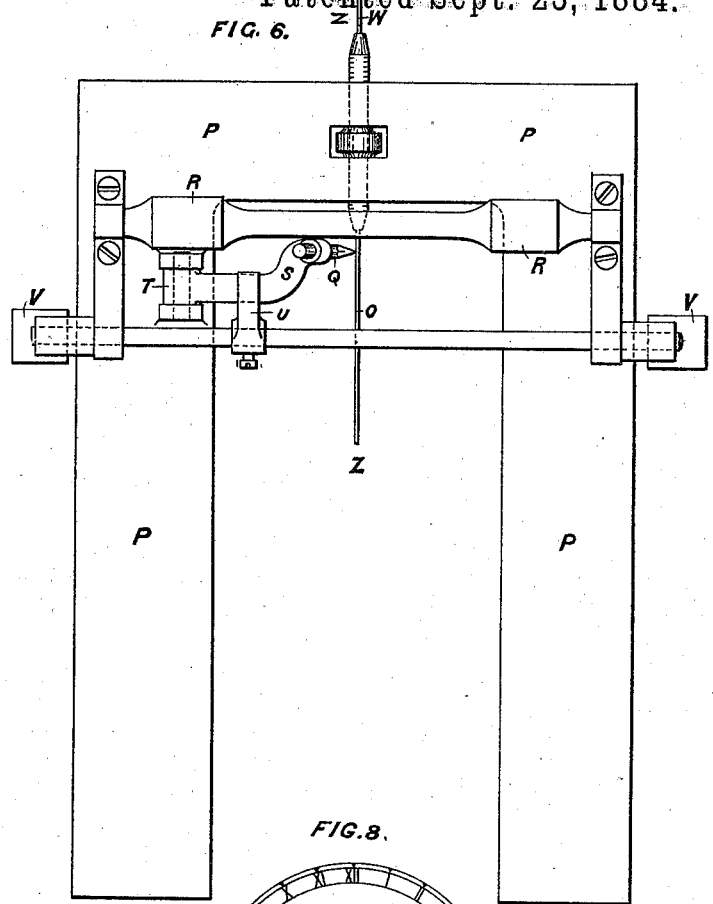
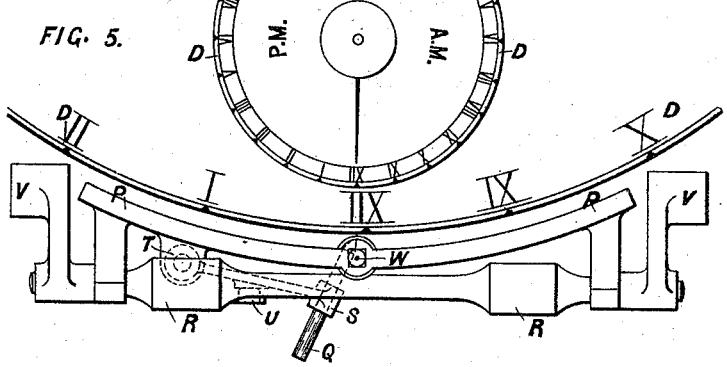
WITNESSES.
Frederick John Cheesbrough
James Andrew Coulbrough
INVENTOR.
George Frederick Deacon

UNITED STATES PATENT OFFICE.

GEORGE FREDERICK DEACON, OF LIVERPOOL, COUNTY OF LANCASTER, ENGLAND.

APPARATUS FOR INDICATING THE VELOCITY OR MEASURING THE FLOW OF WATER.

SPECIFICATION forming part of Letters Patent No. 305,433, dated September 23, 1884.

Application filed February 20, 1884. (No model.) Patented in England January 10, 1879, No. 105.

*To all whom it may concern:*

Be it known that I, GEORGE FREDERICK DEACON, of Liverpool, in the county of Lancaster, England, civil engineer, have invented or discovered new and useful Improvements in Apparatus for Indicating the Velocity or Measuring the Flow of Water in Pipes, and that the same has not been patented to me or to others with my knowledge or consent, except in the following country, to wit: Great Britain, by Letters Patent No. 105, dated January 10, 1879; and I do hereby declare that the following is a full, clear, and exact description of my invention, sufficient to enable others skilled in the art to which it appertains or with which it is most nearly connected to make, use, and put the same into practice, reference being had to the drawings making a part of this specification, and to the letters and figures of reference marked thereon, which correspond with those used in this specification, like letters and figures being used to denote the same or corresponding parts throughout the various views and figures.

My invention consists of the combination of certain mechanical devices arranged to coact with reference to each other to produce the result hereinafter fully specified, the points of novelty being designated in the claims concluding this specification.

My present invention relates to certain improvements on a previous invention for which I obtained Letters Patent for the United States dated September 21, 1875, No. 167,994, entitled "apparatus for indicating and recording the velocity of water in pipes."

Figure 1:
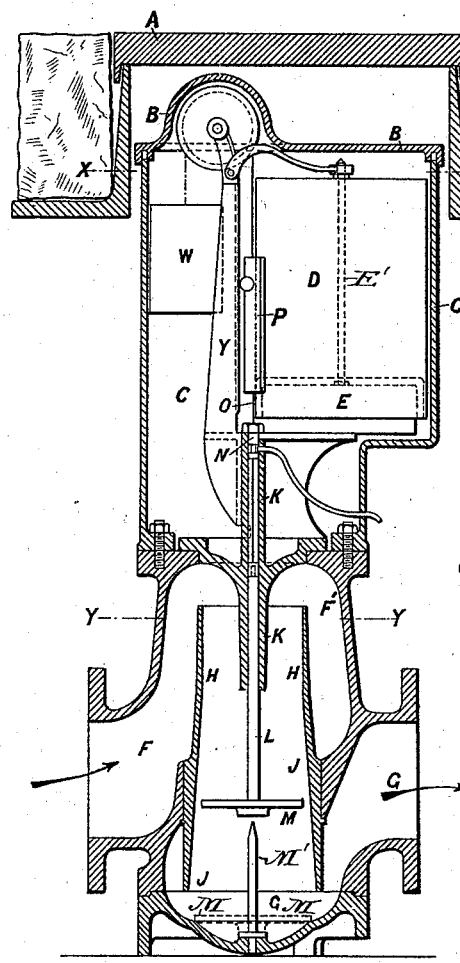
Figure 2:
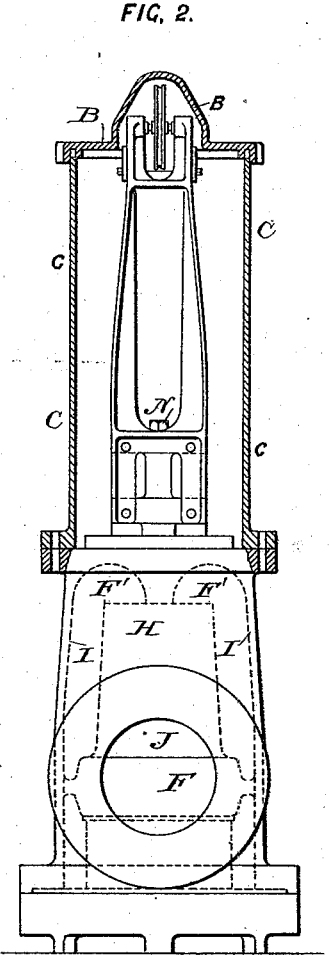
Figure 2:
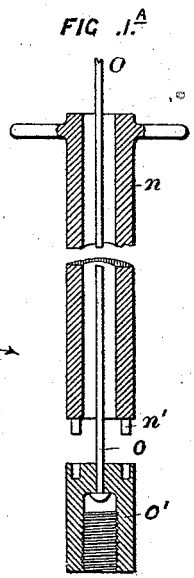
Figure 3:
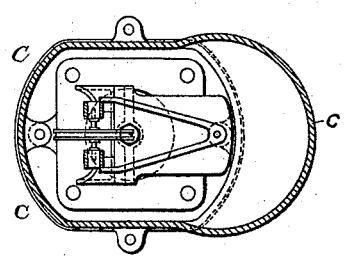
Figure 3:
Figure 4:
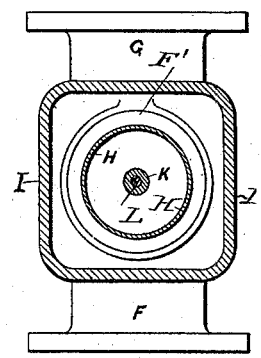

In the drawings, Figure 1 is a sectional elevation of an apparatus for indicating and recording the velocity of water in pipes according to my invention. Fig. 1$^A$ is an enlarged view, showing the means I employ to renew the disk-wire. Fig. 2 is a side view of Fig. 1, partly in section. Fig. 3 is a sectional plan through X X, Fig. 1. Fig. 4 is a sectional plan through Y Y, Fig. 1. Fig. 5 is a plan showing the arrangement and construction of devices for carrying, guiding, and holding the pencil, pen, or tracer. Fig. 6 is a front elevation of Fig. 5. Fig. 7 is a section through Z Z, Fig. 6. Fig. 8 is plan view of the full dial, a segment of which is shown in Fig. 5.

Apparatus hitherto constructed and as described in the specification of my former Patent No. 167,994 are generally known as "waste-water meters," and have in nearly all cases been employed for the purpose of measuring and recording graphically the state of flow in mains used for the supply of water to various sections of a town or district, and they have generally been placed beneath the footways of streets, and so connected with the mains that all the water passing through the mains passes, or may be caused to pass through the meters also. The cost of adapting such a meter to its work would be much reduced and the arrangement would be much simplified if the meter could be placed directly upon the main; but unless the size of the portion of the meter which opens and of its independent cover can be greatly reduced, the weight of the cover, though not inconvenient when adapted to a footway, would become most inconvenient if increased so as to make it strong enough to be placed in a carriage-way. By my present invention I render possible the reduction in size of the box or case of the meter, and consequently of the cover, by placing the clock which has hitherto occupied space without the drum within it.

In my said former invention a perforated diaphragm was employed to equalize the flow of water to a disk in the tapered tube, down which the water flowed. Under my present improvements I have in view the object of attaining greater accuracy in recording the flow of water by employing a more perfect arrangement and construction of parts for this purpose; also, a more perfect arrangement and construction of parts for guiding and holding the pencil, pen, or tracer.

My present improvements consist in the construction and arrangement of parts, as shown in the drawings, in which—

A is the independent cover flush with the roadway.

B is the cover of the meter box or case C, which case C is so constructed as to increase its compactness and thereby reduce the size of the street-cover A, so that the meter can be used in a carriage-way without making the cover too heavy for one man to lift.

D is the drum upon which the diagram-paper or other material is placed. This drum has hitherto been caused to revolve by external clock-work; but in my present improvements the drum D is revolved by clock-work E within and beneath the drum D. The frame of the clock E is fixed, and the spindle E' of the drum D is driven by the central arbor of the clock E, upon which it rests.

Instead of the perforated diaphragm used in my former Patent No. 167,994, I make the inlet water-way F to surround the tapered tube J J. The upper part of the inlet water-way F' surrounds and is concentric with a straight tube, H, forming the upper part of the tapered tube J. The lip of the straight tube H being circular or a figure of revolution, and easily constructed to any given section and diameter, the distribution of velocity in the particles of water flowing over the tube H will, if the inlet water-way F F' surrounding it is moderately constant in form, be practically constant also. Constant distribution of velocity passing through the perforated diaphragm used under my former patent was less readily attained. The figure of the section of the lip of the tube H is not highly important. It may approach that of the *vena contracta* with possibly greater uniformity of velocity; but constancy of distribution of velocity is alone necessary, and is perfectly attained by means of the tubular inlet-tube H and its lip of constant gage and section, even though the general figure of the water-way F' may be modified.

In the form of the meter-body employed under my former invention, the inlet and outlet were at different levels, and at every part of its travel the disk M obstructed to some extent the water-way. In order to overcome this I, under my present invention, construct the meter-body I, as shown in the drawings, with the inlet F and outlet G at the same level. The water-ways can all be made without difficulty as large or larger than that of the inlet F of the water-way F', so that when a large flow of water takes place the disk M, perforated for that purpose, will pass from the tube J over the guide-pin M' into the position shown in dotted lines, in which position it causes no obstruction whatever in the water-way, so that unlike other meters the loss of head in this meter is inappreciable, and for this reason it may be used direct upon the main without a "by-pass."

In the forms of meters at present in use the wire communicating between the disk and the pencil-carrier and the bush through which that wire passes are the only parts which wear so as to require renewal, except after a very long period of working. By my present invention I facilitate the means of renewing these parts by making the bush N and upper part of the guide-tube K accessible from the clock-chamber C in such a manner that they may be withdrawn and a new bush and wire at once placed in position. This is effected in the way shown in Fig. 1, where K is the guide-tube, in which slides the stem L of the disk M. This guide-tube K projects upward in the case C, and at its head the bush N is placed. In my said patent the bush N was placed part way down the tube K, and any water which escaped through the orifice made for the passage of the wire O overflowed at the top of the tube, and was then drained away through the chamber C. Without removing the guide K, and thus opening the water-chamber F', this bush N could not be renewed. In its position, according to my present invention, the bush N may be renewed without opening the water-chamber F', and the bush N is constructed with a lateral opening, into which a pipe is inserted having an outlet outside the case C, so that any water which oozes through the bush below that opening will be drained away.

The wire O, attached to the screwed cap O' of the disk-stem L, is removed and replaced as follows, (see Fig. 1$^A$ of the drawings:) The disk M resting on the bottom of the outlet G, the bush N is removed, and a hollow spanner, $n$, having on its end projections $n'$, is passed down the guide-tube K and around the wire O, so that the projections $n'$ take into corresponding holes in the screw-cap O', which is screwed onto the end of the stem L of the disk M. The cap O' is then removed and withdrawn, and a new wire is attached. The cap O', wire O, and bush N are then replaced. To prevent the disk M from turning during this operation, it is provided with a stop.

In the apparatus hitherto used the carriage which carries the pencil (by the vertical movements of which, combined with the horizontal rotation of the drum, the required diagram is produced) is guided only by rollers or wheels bearing against vertical guides. In this arrangement it is obvious that the pull of the wire, the center of gravity of the carriage, and the point of the pencil are not in the same straight line, so that a tendency to tip the carriage is caused, which permits the point of the pencil both in rising and falling to lag slightly behind its proper position. In any ordinary arrangement this can only be overcome by increased guiding and friction. By my present invention this tendency to error in the position of the pencil Q is overcome by bringing the drum D and the point of the pencil Q as near as practicable to the line of the wire by making the carriage which carries the pencil of such figure that it may in plan partly encompass the drum D, so that the center of gravity of the carriage will be nearly in the line of pull and of the point of the pencil.

The arrangement by which this improvement is carried into effect is shown at P, Fig. 1, and on a larger scale in Figs. 5, 6, and 7. P is the frame of the carriage, concentric with the drum D, the top of which, in Fig. 5, is a dial inscribed with twelve hours for each half-revolution. The rollers R work against the guide Y, and are merely employed to prevent the backward pressure of the weight or lever which holds the pencil Q against the drum from throwing the carriage P from the drum. The dial is shown on a smaller scale. In order to press the pencil Q against the drum D, I employ a weight and lever, and thus secure a constant pressure, which when once set requires no further adjustment to make the pencil mark well. In Figs. 5, 6, and 7 this result is obtained by placing the pencil Q in one end of a lever, S, pivoted at its opposite end T. Against the lever S a lever, U, is pressed by a torsional pressure produced by the weights V.

In the foregoing specification the parts of the meter are referred to as they are placed in the apparatus hitherto most generally adopted and as they are shown in the drawings; but it will be understood that my improvements are applicable to any similar apparatus if inverted or placed in any other position.

Having now described my improvements, I claim as my invention, and desire to secure by Letters Patent, the following:

1. In apparatus for indicating the velocity or measuring the flow of water in pipes, the combination of an inlet-pipe, F, tapering tube J, vibrating disk M, and outlet-pipe G, the said tapering tube, disk, and outlet-pipe being constructed and combined, whereby the disk can fall clear of the water-way, substantially as and for the purpose described.

2. In apparatus for indicating the velocity or measuring the flow of water in pipes, the combination of a drum, D, vibrating mechanism M, and pencil-carriage P, whereby the center of gravity of said carriage is made practically coincident with the circumference of the drum and the line of pull, substantially as described, for the purpose specified.

3. In apparatus for indicating the velocity or measuring the flow of water in pipes, the combination of drum D, actuating mechanism E, pencil-carriage P, disk M, inlet and outlet pipes F and G, tube H J, and annular chamber F', substantially as described.

4. In apparatus for indicating the velocity or measuring the flow of water in pipes, the combination of an inlet-pipe, F, annular chamber F', elevated above the level of the same, and a tube, H J, concentric therewith, substantially as and for the purpose described.

5. In apparatus for indicating the velocity or measuring the flow of water in pipes, an inlet-pipe, F, and outlet-pipe G, both upon the same level, combined with the elevated annular chamber F', tube H J, and gaging-disk M, substantially as described.

6. In apparatus for indicating the velocity or measuring the flow of water in pipes, the combination of a drum, D, actuating mechanism E, vibrating mechanism M, pencil-carriage P, pivoted pencil-holder S, and weighted lever U V, substantially as described.

GEORGE FREDERICK DEACON.

Witnesses:
FREDERICK JOHN CHEESEBROUGH,
JAMES ANDREW CONBROUGH,
Both of 15 Water Street, Liverpool, England.